United States Patent Office 3,405,891
Patented Oct. 15, 1968

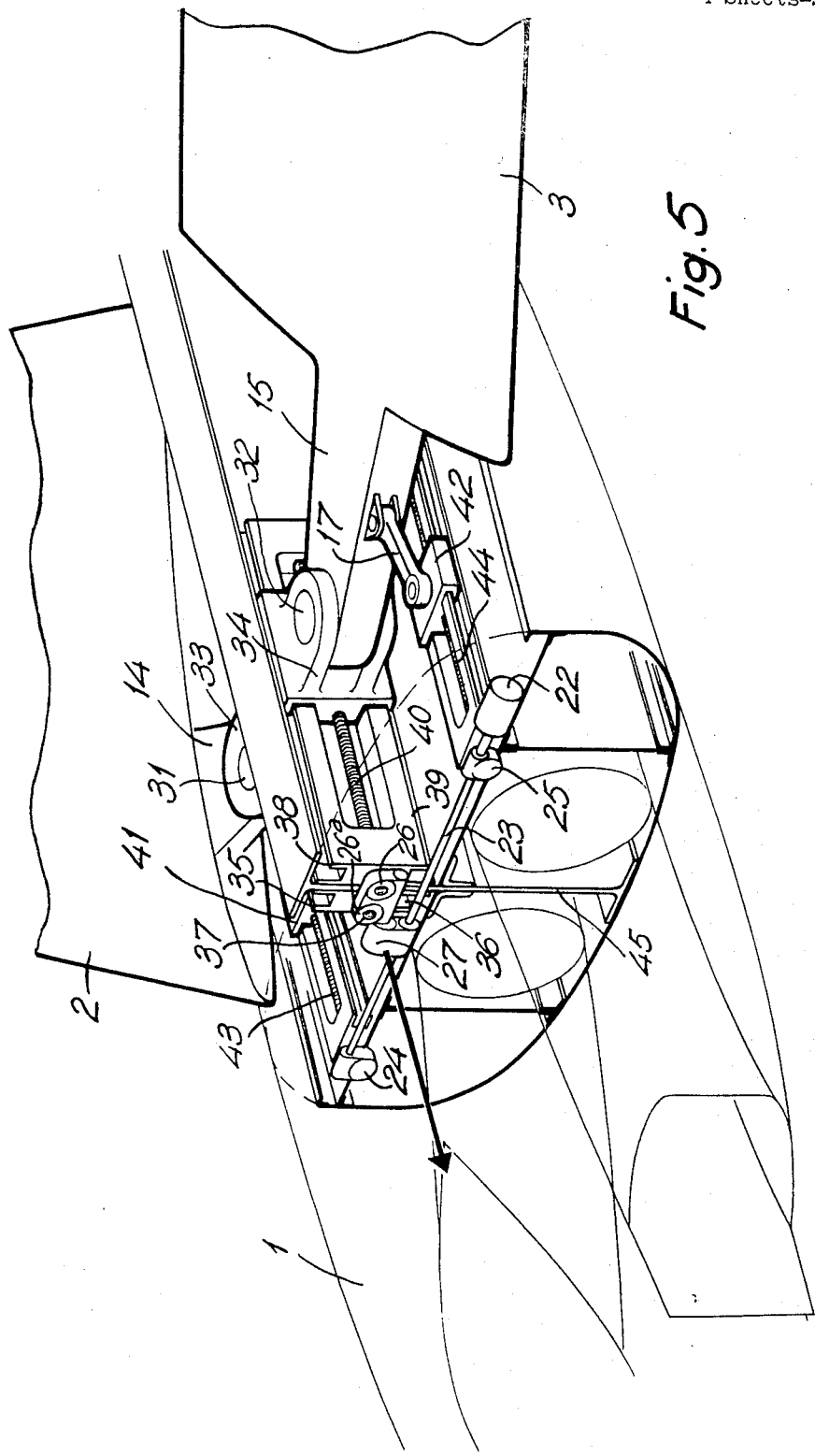

3,405,891
VARIABLE-GEOMETRY AIRCRAFT WITH TWO WING HINGE AXES ON THE FUSELAGE
Raymond Jacquart, Boulogne-sur-Seine, and Richard Desire Haze, Saint-Ouen, France, assignors to Sud-Aviation Societe Nationale de Constructions Aeronautiques
Filed Oct. 11, 1966, Ser. No. 585,903
Claims priority, application France, Oct. 19, 1965, 35,423
5 Claims. (Cl. 244—43)

ABSTRACT OF THE DISCLOSURE

A variable-geometry monoplane aircraft, the wing system of which is constituted of two wings, each pivotally mounted on an articulating pivot carried by a longitudinally displaceable main slide, each wing carrying a link pivotally mounted thereon and upon a second pivot on a similarly longitudinally displaceable secondary slide.

---

Figure 1:
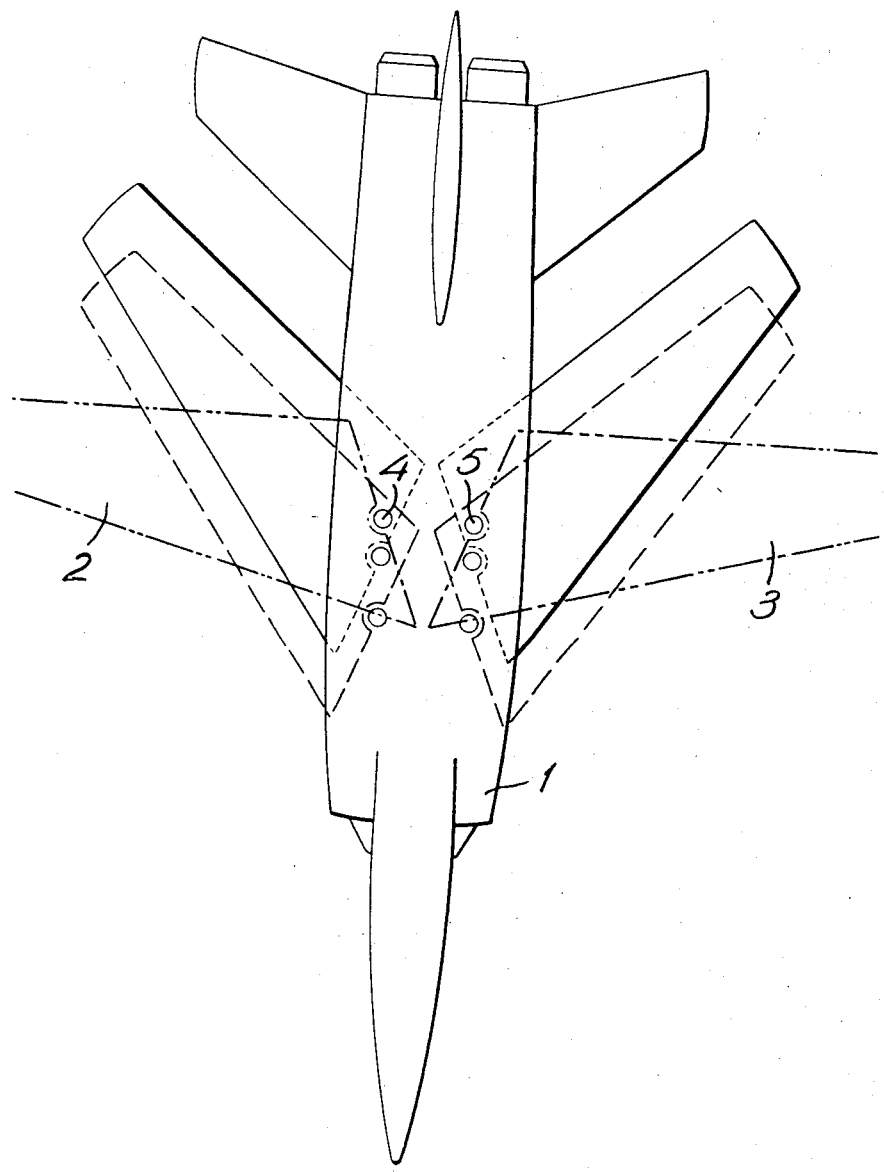

In U.S. patent application Ser. No. 579,645, filed Sept. 20, 1966 by the applicant, entitled "Improvements in or Relating to Variable-Geometry Aircraft," there was described a monoplane aircraft enabling both the wing sweepback and the position of the wings along the fuselage to be varied. To that end each wing is hingedly connected to a central pivot common to both wings and rigidly united with a central slide which is movable in parallelism with the fuselage centerline, each wing being additionally connected through a linkage system to a likewise movable lateral slide which either translates the wing bodily or swings it about its pivot.

It should be recalled that this solution has the advantage that, by an appropriate swiveling and/or longitudinal displacement of the wings, it is possible to locate the center of rotation and hence the center of pressure of each wing as required so as to adapt the aircraft to all flight speeds.

It is the object of the present invention to provide a variable-geometry aircraft of the kind having two lateral or central pivots connecting each wing to the fuselage.

The advantages of a system utilizing two wing pivots over that described in the above-cited patent application reside, first and foremost, in a simplified fabrication of the wing-spars and the pivots, which undergo no depth-wise distortion and remain included in the airfoil thickness, and, second, in the additional useful space gained in the fuselage due to the reduced depth of the spars and pivots.

According to this invention, each wing is hingedly connected to a pivot rigid with a main slide which is movable parallel to the fuselage centerline, each wing being furthermore connected through a linkage system to a secondary slide which is movable preferably parallel to the fuselage centerline.

In a first form of embodiment of the invention, the main slides which carry the wing hinge pivots are positioned laterally of the fuselage and the inboard end of each wing is extended inwardly, between said pivots, by a pointed projecting portion the tip of which is connected through the associated linkage to a secondary slide common to both wings and lying substantially in the plane of symmetry of the aircraft.

In an alternative constructional form, each hinge pivot is located on the contrary at the inboard end of the corresponding wing and rigidly connected to a central slide which may be common to both wings, the linkage systems being connected to two lateral slides respectively.

The actuating system for moving the different slides may be of the type described in the above-cited patent application, in which case it will include preferably parallel threaded rods, each of which cooperates with a slide and is translated and/or rotated.

When the wings must be moved bodily without change in sweepback, the different slides move at the same speed, whereas if it is desired to superimpose a change in sweepback upon such translation, the middle slide is moved at a speed different from that of the lateral slides, for example by operating on a gearbox connected across the threaded rod cooperating with the slide, and the drive mechanism thereof. This gearbox is controlled by the pilot, who can thus select different combinations of translation and rotation.

Preferably, different threaded rods are driven through worm-type reduction gears interconnected by a common drive shaft.

The description which follows with reference to the accompanying non-limitative exemplary drawings will give a clear understanding of how the invention can be carried into practice.

Figure 2:
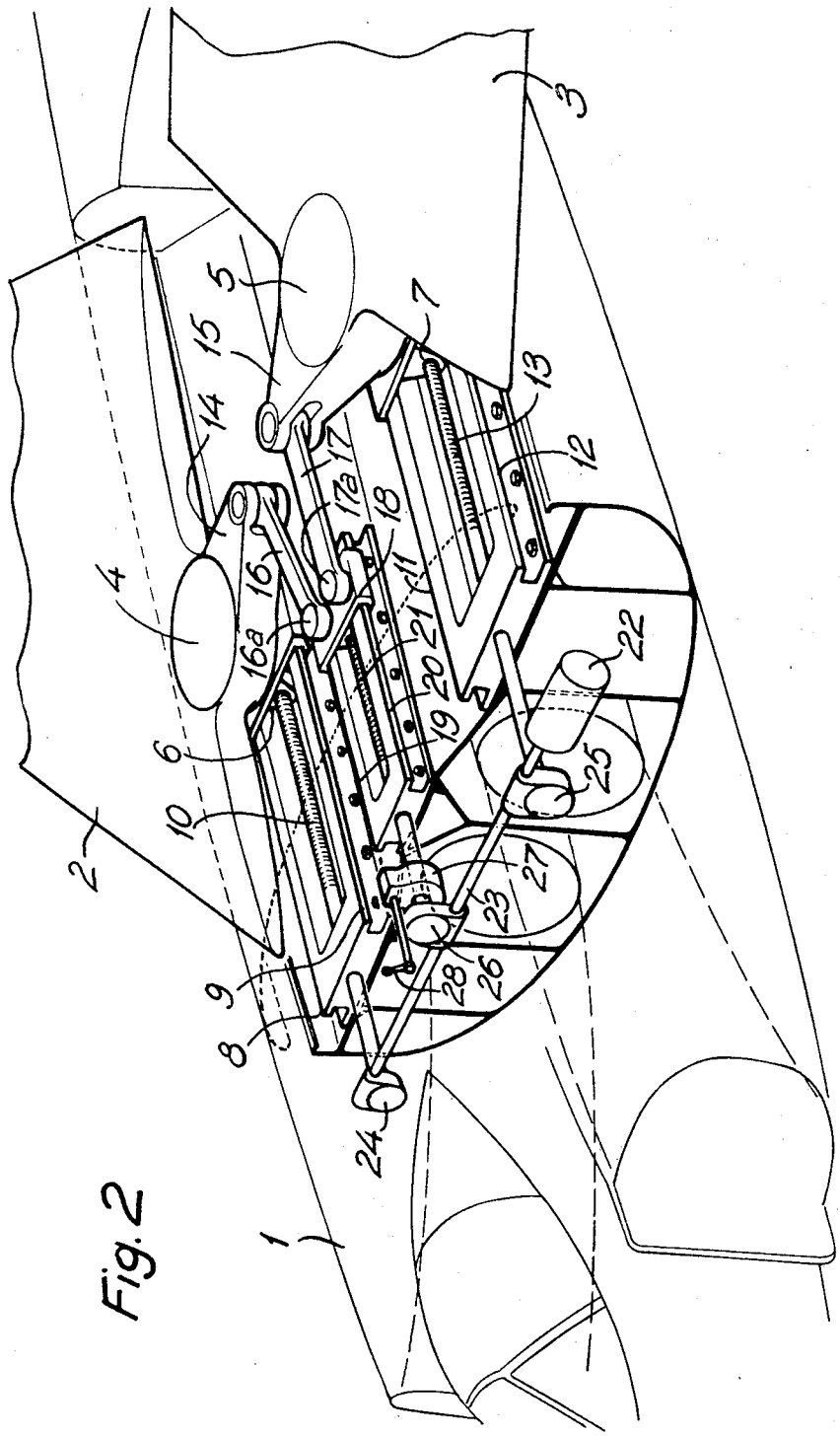
Figure 3:
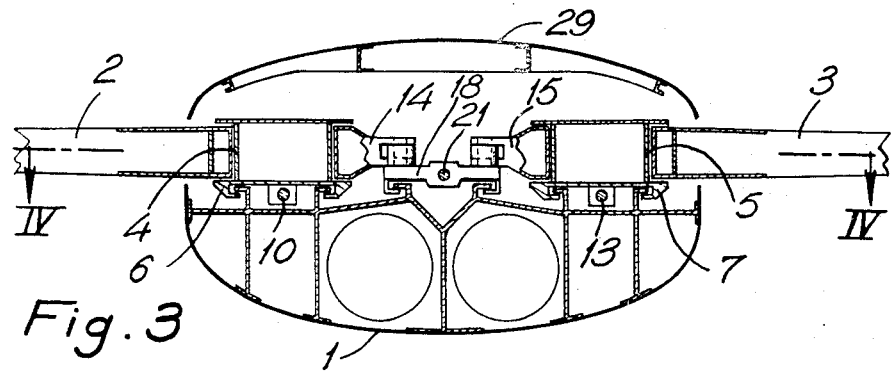
Figure 4:
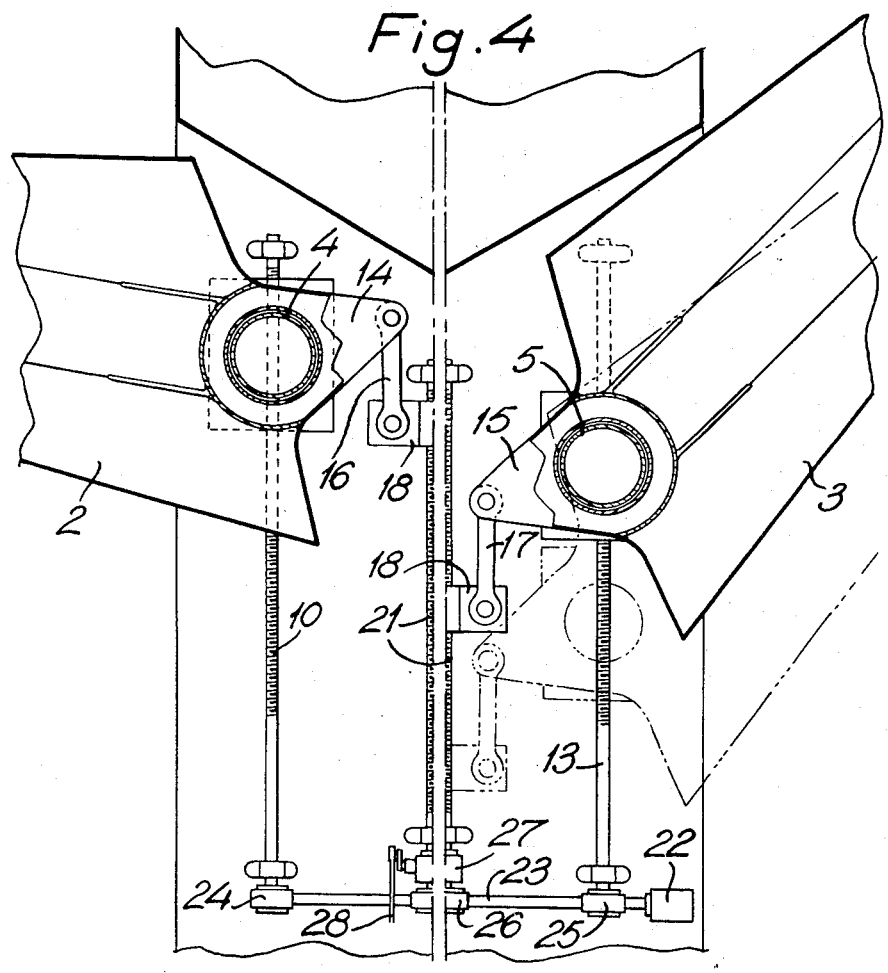

In the drawings:
FIGURE 1 shows in diagrammatic planform a variable-geometry aircraft according to the invention, the wings being shown in three different positions.
FIGURE 2 is a schematic perspective view of the system according to the invention, the main fuselage structure being shown to have been cut away.
FIGURE 3 is a cross-section taken through the axes of the wing hinge pivots in FIGURE 2.
FIGURE 4 is a section taken on the line IV—IV in FIGURE 3, each half of the figure showing a different wing position; and
FIGURE 5 shows diagrammatically in perspective an alternative embodiment of the device according to the invention.

FIGURE 1 schematically illustrates a variable-geometry monoplane 1, the wings 2 and 3 of which are hingedly connected to pivots 4 and 5, respectively, which are substantially perpendicular to the plane of displacement of the wings and movable in parallelism with the plane of symmetry of the fuselage. It is thus possible to modify the sweepback of the wings by swiveling the same about said pivots, while the longitudinal displacement of pivots 4 and 5 enables the wings to be located at a required longitudinal position along the fuselage.

In the constructional form shown in FIGURES 2 to 4, pivots 4 and 5 are connected to two lateral slides 6 and 7 respectively. Slide 6 carries two curved members engaging two lateral guide rails 8 and 9 extending parallel to the fore-aft axis of the aircraft, and slide 6 is translated along its rails by a threaded rod 10 engaging a screw-thread formed in a central boss of slide 6. Slide 7 is similarly driven along rails 11, 12 by threaded rod 13. The different guide rails are mutually parallel and parallel to threaded rods 10, 13.

In this specific constructional form, the inboard end of each wing is extended beyond the corresponding pivot by a projecting portion (designated by reference numeral 14 for wing 2 and by numeral 15 for wing 3) the tip of which is connected through a link (16 and 17 respectively) to a common middle slide 18 through a pivot (16a and 17a respectively). Slide 18 includes a central boss and is movable along longitudinal guide rails 19 and 20 by being driven by a threaded rod 21 extending through the boss and threadably engaging therewith. Rod 21 may be parallel to threaded rods 10 and 13, in which case it will be of advantage for all the rods to have the same screw-thread pitch, whereby by rotating them at the same speed the two wings may be translated bodily without change in sweepback.

Thus, the wing geometry modifying system which operates on the wing sweepback, position and area, includes three parallel threaded rods in which either the three rods are rotated at the same speed or the middle rod at a different speed from the lateral rods.

Uniform rotation of the three threaded rods 10, 13 and 21 causes uniform longitudinal displacement of the three slides, i.e. of middle slide 18, which is guided by rails 19 and 20 and connected to links 16 and 17, and of lateral slides 6 and 7 which are guided by lateral rails 8, 9 and 11, 12 and are connected to pivots 4 and 5. Such uniform rotation consequently produces longitudinal displacement of the wing without change in sweepback.

In contradistinction, rotation of the three threaded rods at different speeds will produce combined longitudinal displacement and swiveling of each wing about the associated pivot 4 or 5, responsively to link 16 or 17.

Threaded rods 10, 13 and 21, which preferably have square screw-threads, can be driven as described in the above-cited patent application, i.e. by means of a motor 22 driving a transverse power shaft 23 coupled to said rods through worm-type reduction gears 24, 25 and 26 respectively, a mechanical or electric gearbox 27 being operatively connected to middle threaded rod 21 and equipped with a control member 28 operated by the pilot.

Gearbox 27 fitted to said middle rod enables the rotation speed thereof to be varied in relation to that of the lateral rods. This is achieved by causing drive shaft 23 to be drivingly connected at all times to lateral rods 10 and 13 through reduction gears 24 and 25, and, depending on the position of control 28, to drive, through reduction gear 26, either rod 21 in direct drive, or the intermediate gears of gearbox 27. Thus, direct drive of middle rod 21 ensures uniform rotation of the three threaded rods, with consequent bodily displacement of the wings without change in area or sweepback thereof, whereby to relocate the center of gravity of the aircraft.

In contradistinction, actuation of gearbox 27 will cause the rods to rotate at different speeds, thereby moving the slides through different distances and enabling the wing geometry to be modified in respect at once of wing sweepback, area and longitudinal position.

It is possible in this way to determine the wing swiveling angle as a function of the geometrical data stemming from the above factors and to accordingly locate the wing swiveling center as required.

The general principle of operation of such variable-geometry wings is as follows:

(a) At take-off the wing span is at a maximum and the sweepback at a minimum, as shown in dot-dash lines in FIGURE 1 and on the left-hand half of FIGURE 4.

(b) In flight, the wings are translated longitudinally and swung back to the required sweepback, these modifications taking place simultaneously by causing the middle rod to rotate at a different speed from the lateral rods, whereby the position shown in solid lines in FIGURE 1 and in the right-hand half of FIGURE 4 is obtained.

(c) In flight, a longitudinal displacement only of the wings may be effected if a relocation of the center of gravity should prove necessary, this being accomplished by rotating the three threaded rods at the same speed. This could result, for instance, in the position shown in broken lines in FIGURE 1 and in dot-dash lines in FIGURE 4.

(d) For the approach and landing, the above-described operations are reversed.

It is to be noted that mounting of the above-specified variable-geometry system on the aircraft is facilitated by the provision of a removable cover 29 atop the fuselage (see FIG. 3).

In an alternative form of embodiment shown in FIGURE 5, in which like parts as those in FIGURE 2 are designated by like reference numerals, the wing hinge pivots 31 and 32 are supported on the free ends of projecting portions 14 and 15 of wings 2 and 3 respectively. Each of said pivots is mounted in a yoke fixed to a slide (designated by reference numeral 33 with respect to pivot 31 and by numeral 34 with respect to pivot 32). Through the agency of sectional members, slide 33 engages two superimposed guide rails 35 and 36 and embodies a boss through which a threaded rod 37 extends co-extensively with the fuselage fore-aft axis. Similarly, slide 34 can be moved along rails 38 and 39 by means of a threaded rod 40, and these two systems are symmetrical in relation to the fore-aft axis of the aircraft. Slides 33 and 34 are devised so as to operate as a single central slide.

In this specific constructional form, links 16 and 17 are hingedly connected, at one end, to the sides of projecting portions 14 and 15 of wings 2 and 3 and, at the other end, to lateral slides 41 and 42, respectively, translatable by lateral threaded rods 43 and 44 respectively. Otherwise, the system is identical to that described with reference to FIGURE 2, as is also its principle of operation. In this case, however, there are two central reduction gears 26, 26a instead of only one, since there are two central rods. These two reduction gears are driven through the same gearbox 27 positioned between them and drive shaft 23.

The advantage of this constructional form is that it permits installation, in the plane of symmetry of the aircraft, of a beam having a fixed web 45 which interconnects the ventral and dorsal portions of the fuselage and to the opposite sides of which may be secured guide rails 35, 36 and 38, 39, respectively. This arrangement makes it possible to distribute the stresses produced by the wings over the entire fuselage section and to balance the loads on the two wings directly, whereby a lighter and more compact structure is obtained.

Obviously, many changes and substitutions of parts could be made in the specific forms of embodiment hereinbefore described, without departing from the scope of the invention. By way of example, in the system shown in FIGURE 5, the central beam referred to could be a box-spar in the case of larger aircraft, whereby the central rods would be more widely spaced. Further, in the case of the system shown in FIGURE 2, the links 16 and 17 could be pivotally connected to central slide 18 through the medium of a single hinge replacing the two pivots 16a and 17a. In addition, in all the constructional forms, the various slides could be driven by their threaded rods, not by causing same to rotate within a threaded boss but instead by rigidly uniting them to their respective slides and moving them bodily longitudinally, as described in the patent application referred to in the preamble. Further, gearbox 27 could in all cases be interposed either between the drive shaft and the corresponding reduction gear, or between the latter and the corresponding threaded rod.

What we claim is:

1. A variable geometry monoplane aircraft having a wing system constituted of two wings and comprising a first articulating pivot for each wing, a main slide means carrying each pivot, means supporting the main slide means for longitudinal displacement relative to the aircraft, a second articulation pivot for each wing, a link pivotably connected to each wing and to a corresponding second pivot, secondary slide means supporting said second pivots, and means supporting said secondary slide means for longitudinal displacement parallel to the first slide means, and means for displacing said first and secondary slide means at the same or different speeds to vary selectively the sweepback of the wings and the longitudinal position of the wings, either concurrently or separately.

2. An aircraft as claimed in claim 1, wherein said main slide means and said secondary slide means respectively comprise a slide for each pivot and said means which supports the slide means comprises longitudinal slideways for said slides, said means for displacing the slide means including drive elements for displacing the main and secondary slides along their slideways at the same or different speeds.

3. An aircraft as claimed in claim 1, wherein said secondary slide means comprises a single secondary slide carrying said second pivots and said means which supports the secondary slide means comprises a single central slideway, said main slide means comprising a slide for each said first pivot, said means which supports said main slide means comprising respective slideways for the main slides located on either side of said central slideway, each wing including an extension located inboard of its respective first pivot, said links being pivotably connected jointly to the second pivots on said secondary slide and separately to its respective extensions.

4. An aircraft as claimed in claim 1, wherein said main slide means comprises a main slide carrying each first pivot, said means which supports the main slide means comprising central slideways for said main slides, said secondary slide means comprising a secondary slide for each second pivot, said means which supports the secondary slide means comprising slideways for said secondary slides located laterally of the central slideways, each wing including an inboard extension coupled to a respective first pivot, said links being pivotably connected to said second pivots on said secondary slides and to said extensions outboard of said first pivots.

5. An aircraft as claimed in claim 4, wherein said aircraft has a longitudinal plane of symmetry and a structural member with a web located in said longitudinal plane of symmetry, said central slideways for the main slides being secured to said web of said structural member on opposite sides thereof.

References Cited
UNITED STATES PATENTS

| | | | |
|---|---|---|---|
| 2,683,574 | 7/1954 | Peterson | 244—46 |
| 2,695,144 | 11/1954 | Woods | 244—46 |
| 2,836,381 | 5/1958 | Carrillo Z. | 244—43 |
| 3,206,146 | 9/1965 | Toms | 244—46 |

MILTON BUCHLER, *Primary Examiner.*

R. A. DORNON, *Assistant Examiner.*